United States Patent [19]
Ruffin

[11] Patent Number: 5,781,301
[45] Date of Patent: Jul. 14, 1998

[54] THERMALLY SYMMETRIC, CROSSOVER-FREE FIBER OPTIC SENSOR COILS AND METHOD FOR WINDING THEM

[75] Inventor: Paul B. Ruffin, Toney, Ala.

[73] Assignee: The United States of America as represented by the Secretary of the Army, Washington, D.C.

[21] Appl. No.: 829,266

[22] Filed: Mar. 31, 1997

[51] Int. Cl.$^6$ .................................................. G01B 9/02
[52] U.S. Cl. ................................................... 356/350
[58] Field of Search ............................. 356/350; 242/7.03

[56] References Cited

U.S. PATENT DOCUMENTS

| | | |
|---|---|---|
| 4,746,080 | 5/1988 | Pinson. |
| 4,793,708 | 12/1988 | Bednarz ........................ 356/350 |
| 4,928,894 | 5/1990 | Ohno et al.. |
| 5,351,900 | 10/1994 | Torney. |
| 5,545,892 | 8/1996 | Brunski et al. ................. 356/345 |
| 5,555,088 | 9/1996 | Valette ........................... 356/350 |

OTHER PUBLICATIONS

Final Technical Report by David S. Fox,—Ruggedized Cable Winding Trade Off Studies. Report No. FOCL–001, published 5 Mar. 1986 by the AFPRO Hughes Aircraft Company, Missile Systems Group, of Tucson, Arizona 85734.

Scientific and Technical Report, Final Series A002, made by William Culver and Ron Smith, dated Mar. 26, 1985, Optelecom, Inc. of 15930 Luanne Drive, Gaitersburg, MD 20877.

*Primary Examiner*—Samuel A. Turner
*Attorney, Agent, or Firm*—Howard G. Garner; Freddie M. Bush

[57] ABSTRACT

A substantially cylindrical symmetrically wound coil for a fiber optic rotation sensor, having a flat cylindrical disc, with a central aperture, disposed in the center of the coil. A continuous optical fiber of substantially uniform cross section having two substantially symmetrical segments extends through the aperture. A spirally wound first fake of a first segment of the fiber is disposed on one side of the disc in a helical spiral extending from the inner diameter of the aperture of the disc to its outer circumference in closely spaced spiral loops. A spirally wound first fake of a second segment of the fiber is disposed on the other side of the disc in a helical spiral extending from the inner diameter of the disc to its outer circumference in closely spaced spiral loops. A first connecting portion of the first segment of the fiber extends from the outer circumference of the one side of the disc across the outer circumference of the disc and the first fake of the second segment of the fiber. A spirally wound second fake of the first segment of the fiber is juxtaposed on the surface of the first fake of the second segment of the fiber in a helical spiral extending from the outer circumference of the disc to the inner diameter of the disc. A first connecting portion of the second segment of the fiber extends from the outer circumference of the one side of the disc across the outer circumference of the disc and the first fake of the first segment of the fiber. A spirally wound second fake of the second segment of the fiber is juxtaposed on the surface of the first fake of the first segment of the fiber in a helical spiral which extends from the outer circumference of the disc to the inner diameter of the disc. A spirally wound third fake of the first segment of the fiber is juxtaposed on the surface of the second fake of the first segment of the fiber in a helical spiral which extends from the inner diameter of the disc to its outer circumference in closely spaced spiral loops. A spirally wound third fake of the second segment of the fiber is juxtaposed on the surface of the second fake of the second segment of the fiber in a helical spiral which extends from the inner diameter of the disc to its outer circumference in closely spaced spiral loops. The ends of each of the segments of the fiber are adapted for connection to a fiber optic rotation sensor.

20 Claims, 7 Drawing Sheets

THERMALLY SYMMETRIC, CROSSOVER-FREE FIBER OPTIC SENSOR COILS AND METHOD FOR WINDING THEM

BACKGROUND OF THE INVENTION

1. Field of the Invention

This invention relates to fiber optic coils for rotation rate sensors such as fiber optic gyroscopes and a method of construction. More particularly, this invention relates to a novel method for winding miniature, thermally symmetric, crossover-free fiber optic sensor coils with substantial improvement over conventional precision winding methods.

2. Description of the Prior Art

Great technological advances in fiber optic gyroscope technology for medium-to-high performance applications have been seen during the last decade. The growing trend toward small, low cost systems has led a number of fiber optic gyroscope technology developers to investigate depolarized fiber optic gyroscope technology that use low cost single mode fiber. Reducing the size of the fiber optic gyroscope technology, without sacrificing the performance, requires that considerable attention be given to the fiber sensor coil. Fiber optic sensor coils (inner diameter exceeding 2 inches) for medium performance gyroscopes typically comprise a minimum of 200 meters of fiber. An ultraminiature coil requires a decrease in the diameter by a factor of 4 or more. This is equivalent to a factor of 4 or more increase in the number of fiber crossover sites in the conventional precision wound configuration. It has been determined that the crossovers cause random polarization cross-coupling in the single mode fiber coil that substantially degrades the fiber optic gyroscope technology performance. This gyro error cannot be canceled out using typical signal processing schemes.

Prior art is disclosed in Pinson U.S. Pat. Nos. 4,746,080 (the conventional precision wind configuration); Bednarz 4,793,708 (the orthocyclic wind configuration); Ohno 4,928,894 (the quadrupolar wind configuration); and Torney 5,351,900 (the improved quadrupolar wind configuration). The flat wind configuration for fiber optic payout bobbins (using optical fibers that are approximately 250 μm in diameter) is discussed in Final Technical Report—Ruggedized Cable Winding Trade Off Studies, Report No. FOCL-001, Mar. 5, 1986 by David S. Fox, published by the Hughes Aircraft Company of Tucson, Ariz.

To the inventor's knowledge, there has not been any attempt to apply the flat winding geometry to fiber optic gyroscope technology sensor coils (where the fiber diameter is typically <140 μm). The subject invention modifies the typical flat winding configuration by making provisions for a thermally-symmetric sensor coil that is less prone to errors caused by time-varying thermal gradients throughout the fiber pack.

A crossover-free coil was manually wound in the laboratory. A 2-fold reduction in the gyro peak-to peak bias uncertainty was observed.

SUMMARY OF THE INVENTION

The invention comprises a novel winding technique for the construction of high performance, thermally symmetric, miniature sensor coils for fiber optic gyroscopes. The method comprises the steps of winding thin optical fibers in a non-conventional manner to eliminate fiber crossovers, while providing excellent thermal symmetries. Crossover-free coils, constructed for fiber optic gyroscopes that use single mode fiber, are less susceptible to polarization mode cross couplings that degrade gyro performance. The winding is initiated from the center of the coil by winding a continuous optical fiber that is supplied from two fiber feed spools, each containing one-half the length of fiber required for the sensor coil. The first layer consists of compact spiral loops of fiber (supplied from the first fiber feed spool) that spirals from the inside of the inner coil diameter to the outside of the outer coil diameter. The fiber is secured to a thin hollow disk via an adhesive that may be applied to the surface of the plate just prior to winding.

A second spiral layer, which is a mirror image of the first spiral layer, is formed from fiber drawn from the second fiber feed spool on the opposite side of the thin hollow disk. Subsequent spiral layers are wound such that the fiber loops which are positioned at equal distances from the center of the fiber optic coil are mirror images of the fiber loops on the opposite side of the thin hollow disk. This novel technique minimizes the timevarying thermal gradients in the radial direction. The invention also provides for winding fiber layers in pairs and sequentially alternating the layer pairs, which are formed from fiber drawn from the two fiber feed spools, across each side of the thin support plate to minimize any time-varying thermal gradients in the axial direction. The first layer in each layer pair is wound from outside to inside and the second layer is wound from inside to outside to maintain coil radial symmetry. The process is continued until the multi-layered, stacked flat coils or fakes of the fiber is completed.

BRIEF DESCRIPTION OF THE DRAWINGS

The invention will now be described with reference to the appended drawings, wherein.

DETAILED DESCRIPTION OF THE INVENTION

Figure 1:
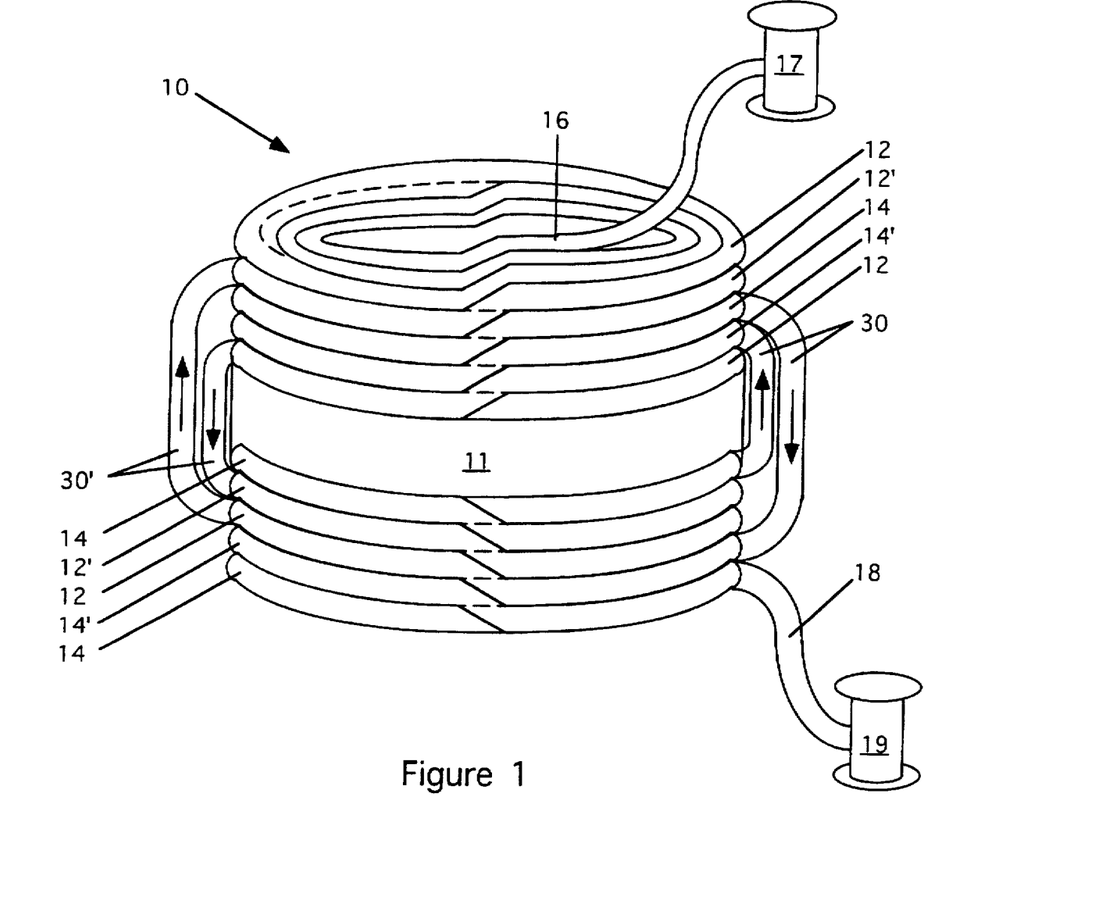
FIG. 1 shows the preferred embodiment of the fiber optic gyroscope coil of the invention.
Figure 2:
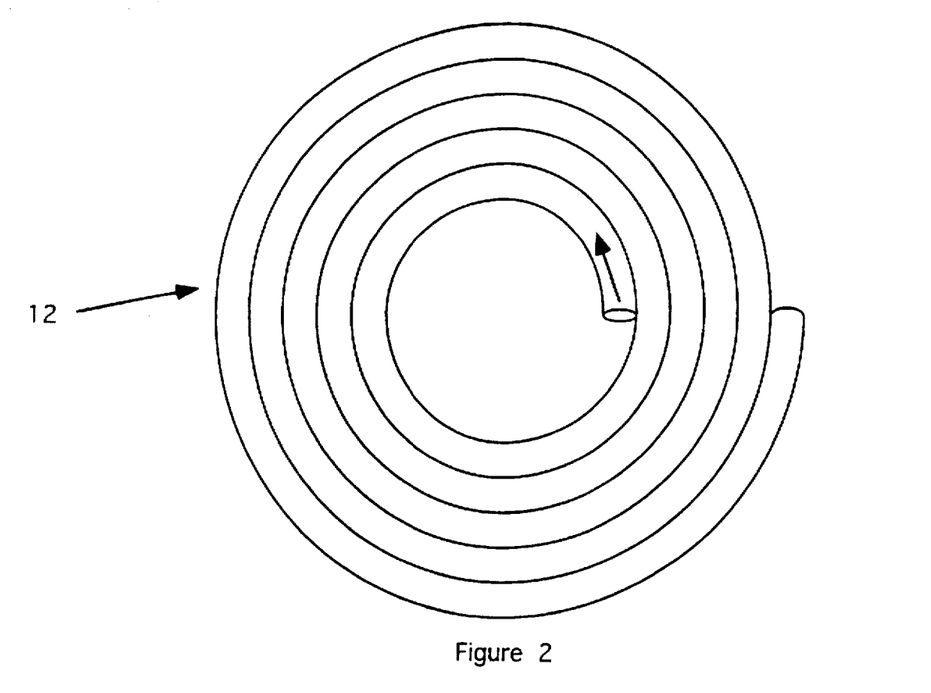
FIG. 2 is a top view of the first layer or fake, of the coil which is wound from the inside to the outside.
Figure 4:
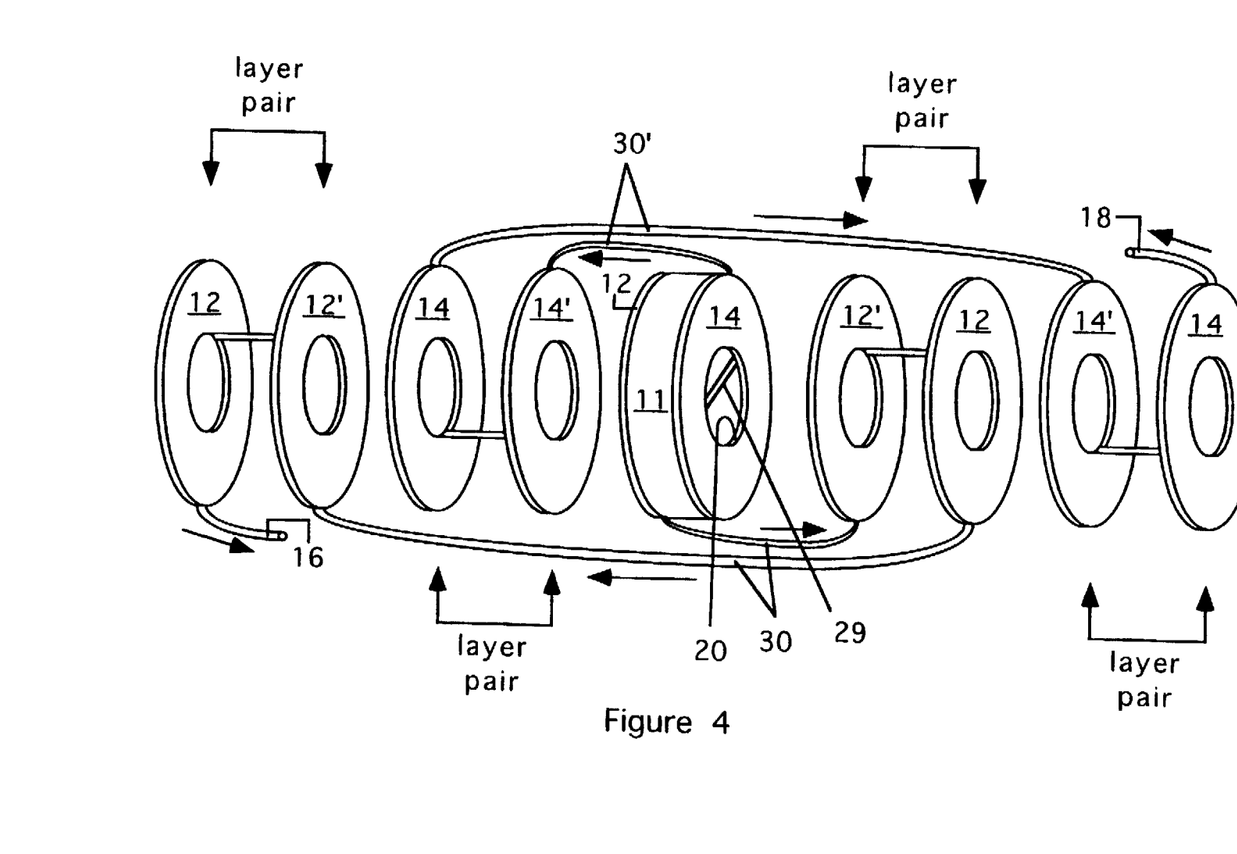
FIG. 4 is an exploded side perspective view of the preferred winding pattern of the flat spiral layer or fake pairs of the invention.

Referring to the drawings, a schematic of the preferred embodiment of the invention is shown in FIG. 1, where a thin hollow disk 11 (similar to a flat ring washer) that provides some structural support for the fiber optic coil 10. The fiber optic coil 10 comprises a plurality of fiber fakes 12, 12' and 14, 14', formed from fiber sections 16 and 18, which are sections of the same fiber supplied from separate spools 17 and 19, respectively. The fiber coil is designated by 10 and the fiber contact points are designated by 32' (seen in FIG. 8). The thin hollow disk 11 has an inner aperture 20 (FIG. 4). The non-conventional flat winding is accomplished through the uniform application of a thin coat of an adhesive to the surface of thin disk 11 to secure the fiber in place. The winding is initiated from the center section of continuous fiber 16,18 that is contained on two feed spools 17, 19, each having an equal amount of fiber. This is made possible by taking the fiber through the aperture 20 (see FIG. 4) during the pre-winding of the two fiber feed spools. The first fiber spiral layer or fake 14 is constructed by accurately positioning the fiber 18 onto the surface of a thin, hollow disk 11 in a series of closelywound spiral loops such that the axis of the fiber sensor coil being formed is coincident with the center of the loops. The inner diameter of the aperture 20 of the hollow disk 11 dictates the minimum inside diameter (I.D.) of the fiber sensor coil. The next spiral layer or fake 12, that is a mirror image of the first fiber spiral layer 14, is formed on the opposite side of the thin disk 11 following the application of a thin coat of adhesive. It should be noted that the direction of the second fiber spiral or fake 12 should coincide with the first fiber spiral layer 14 to maintain a consistent direction for the light propagation. The first fiber spiral layer or fake 14 and its mirror image fake 12 are wound from the inside to the outside, as seen in FIG. 2. The novel technique for initiating the flat coil winding permits subsequent spiral layers to be wound (see FIG. 4) such that the fiber loops 12, 12' at equal distances from the center of the fiber optic coil, are mirror images of the fiber loops 14, 14' on the opposite side of the thin hollow disk 11. This is the best approach to minimizing time-varying thermal gradients in the coil radial direction.

Figure 3:
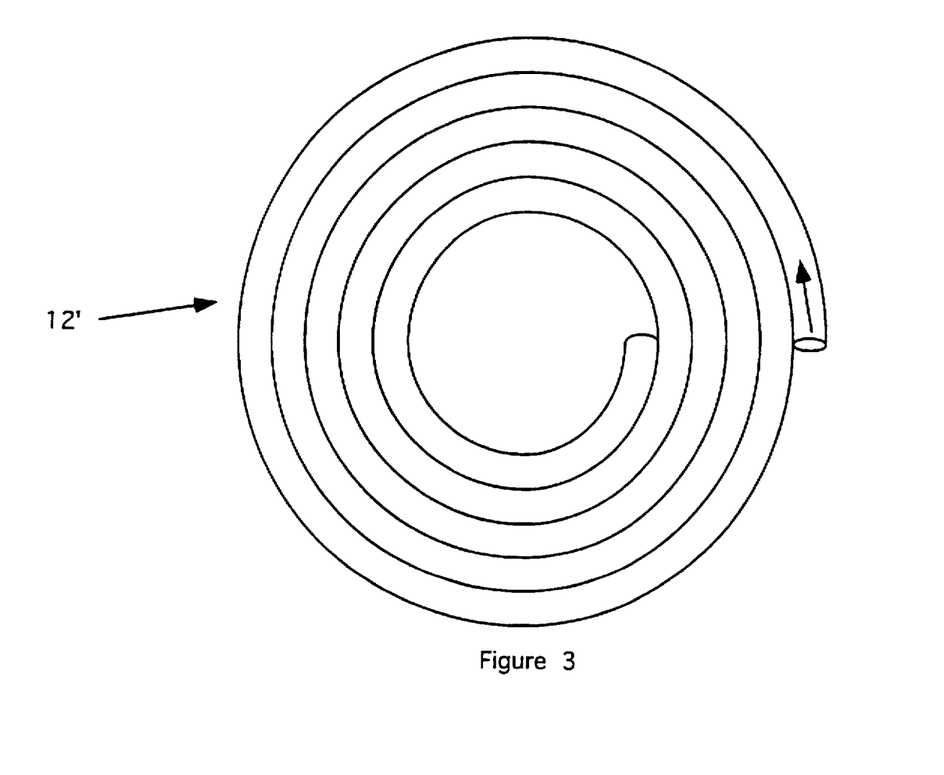
FIG. 3 is a top view of the second layer or fake, of the coil which is wound from the outside to inside.

The subject invention provides for winding the fiber spiral layers in pairs and sequentially alternating layer pairs 12, 12' (which are formed from fiber drawn from feed spool 17), back and forth across the thin hollow disk 11 with layer pairs 14, 14' (which are formed from fiber drawn from feed spool 19). This technique minimizes any timevarying thermal gradients in the axial direction. Compensation for axial thermal gradients is not specifically addressed in the typical quadrupolar wind configuration. The winding of each fiber spiral layer is preceded with the application of a thin coat of adhesive to each adjacent spiral layer that is beneath. Alternately, the fiber may be coated with the adhesive or binder just prior to its being laid down on the surface of disc 11 or on the preceding spiral fake or layer. Any adhesive or binder may be used which will bind the layers together. The two winding directions of the spiral pairs are shown in FIGS. 2 and 3. Each fiber spiral pair consists of two layers that follow the pattern of winding or spiraling the fiber from the outside to the inside and back from the inside to the outside as shown in FIGS. 3 and 2, respectively. This technique must be followed to permit the alternating of the fiber layer pairs across the thin hollow disk 11. The process is continued, as shown in FIG. 4, until the multi-stacked, flat coil is completed.

Figure 5:
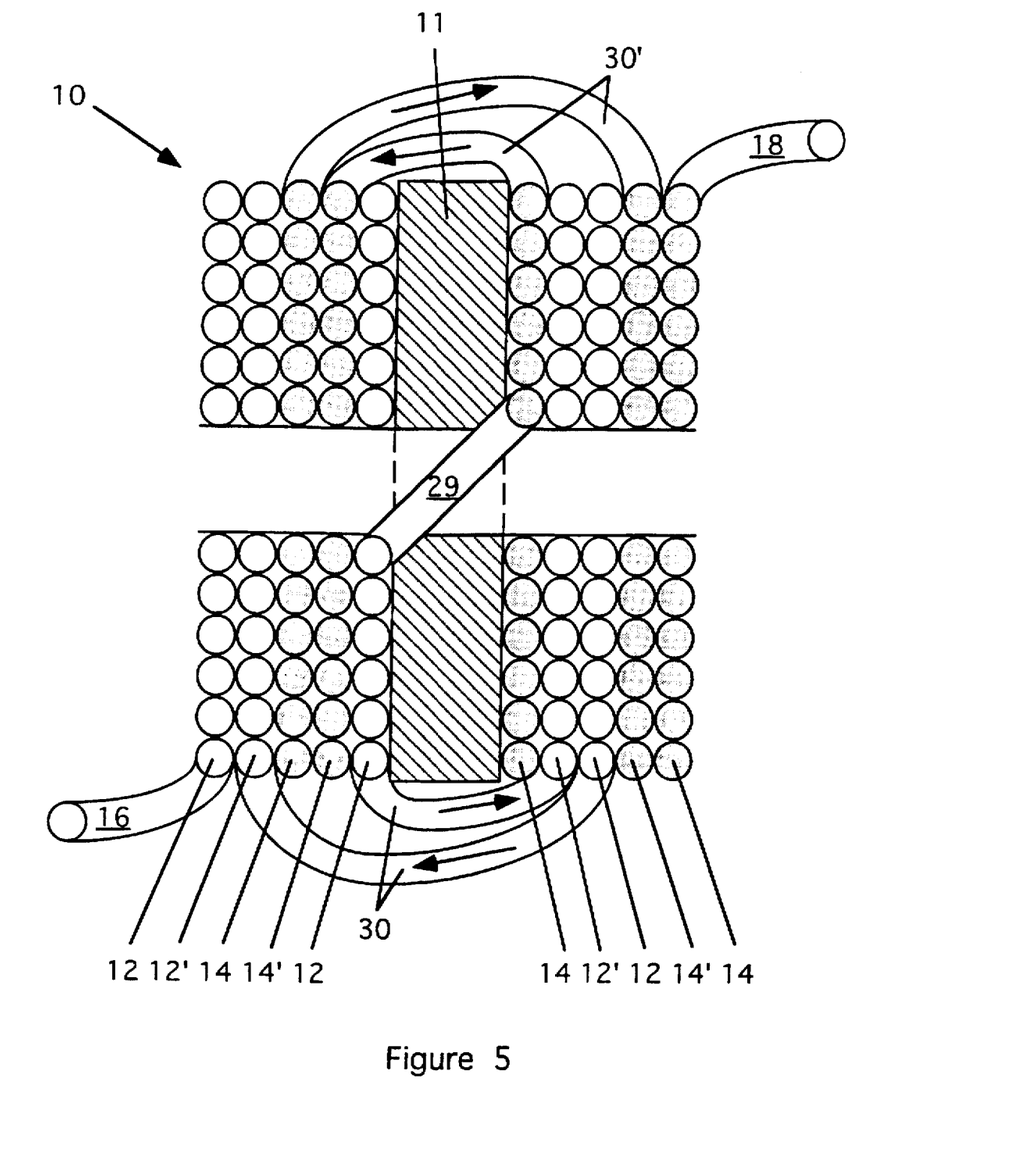
FIG. 5 is a partial, sectional view of the coil of the invention, showing the spiral layers or fakes.

A partial sectional view of the fiber spiral layers is shown in FIG. 5. The fiber inner transition-section 29 represents the center of the fiber. The fiber layers or fakes formed from the first feed spool 17 are distinguished from the fibers wound from the second feed spool 19. The fakes 12, 12' and 14, 14' represent the spiral loops for each spiral layer or fake pairs. The first fake 12 is wound from the inner diameter of the disc 11 to the outer circumference of the disc. The first fake 14 is wound from the inner diameter of the disc 11 to the outer circumference of the disc on its opposite side. Fiber 16 then transitions in outer transition section 30 from the one side of the disc across the outer circumference of the disc 11 and across the first fake 14 of fiber 18. Fiber 16 is then wound on the first fake 14 from the outer circumference of the disc to the inner diameter of the coil. Fiber 16 then reverses its winding direction in a fake 12, being wound from the inner diameter to the outer circumference of the coil. Fiber 18 then transitions in outer transition section 30' from the one side of the disc across the outer circumference of the disc 11 and across the first fake 12 of fiber 16. Fiber 18 is then wound on the first fake 12 from the outer circumference of the disc to the inner diameter of the coil. Fiber 18 then reverses its winding direction in a fake 14, being wound from the inner diameter to the outer circumference of the coil. This process continues to produce pairs of fiber layers until the desired number of layers or fakes are attained.

Figure 6:
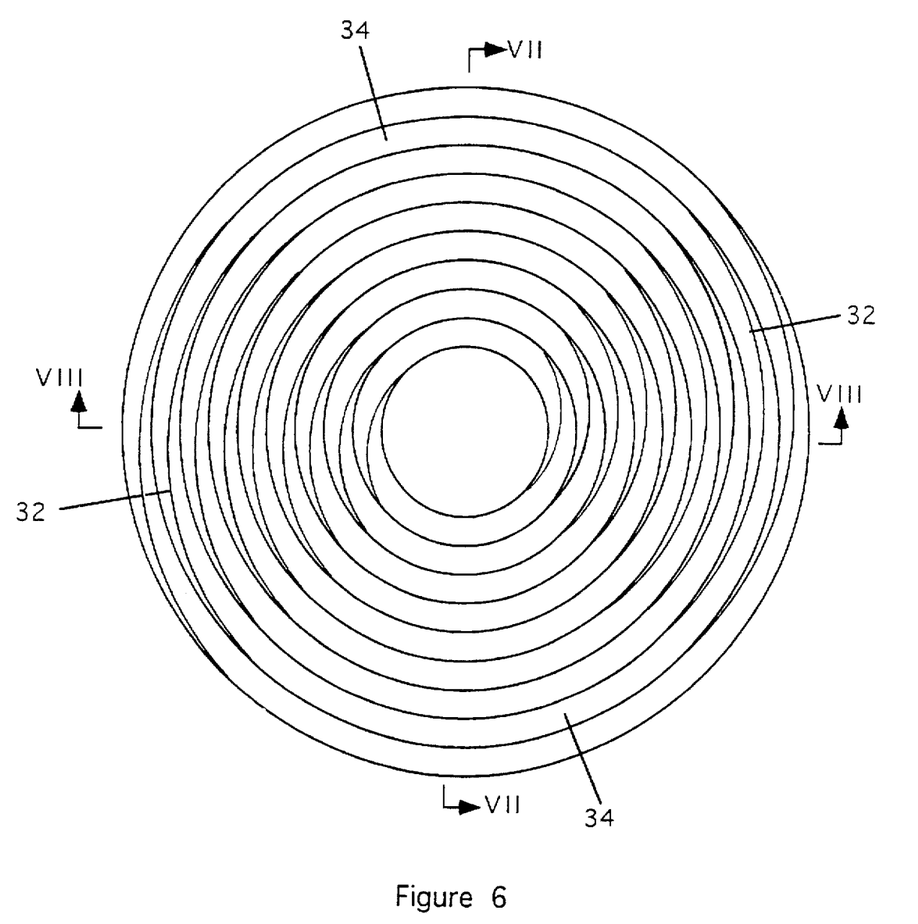
FIG. 6 is a top view of the overlay of the spiral fakes or layers.
Figure 7:
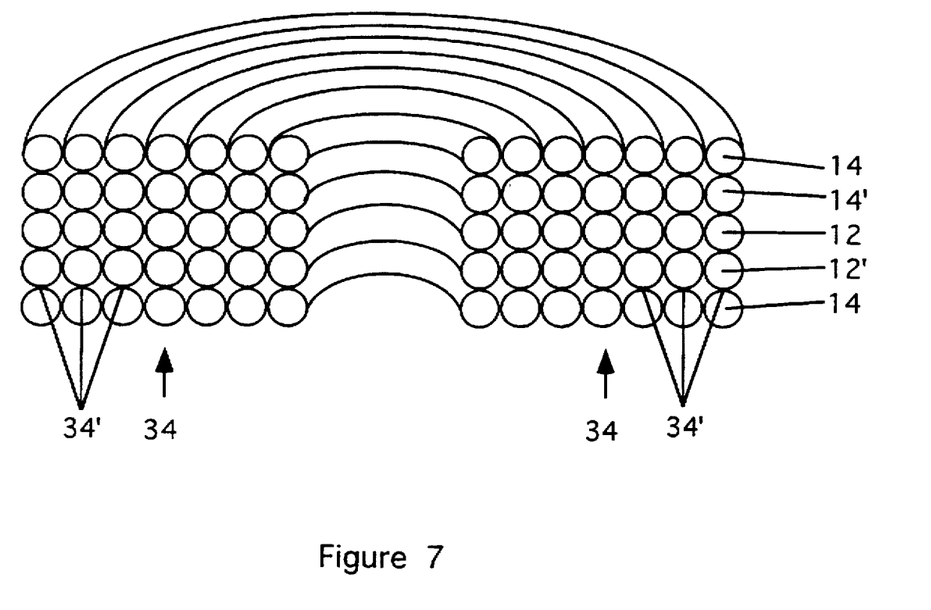
FIG. 7 is a perspective, cross-sectional view of the fakes in juxtaposition, taken along line VII—VII of FIG. 6.
Figure 8:
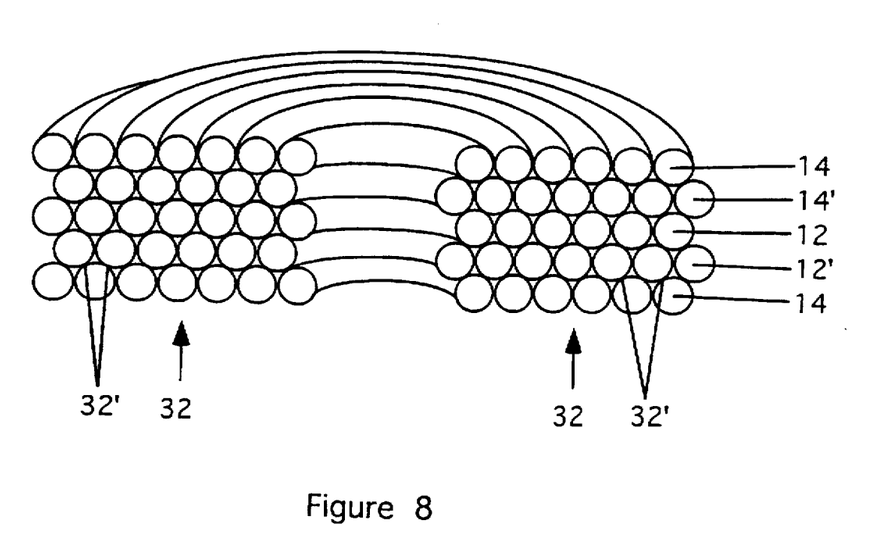
FIG. 8 is a perspective, cross-sectional view of the fakes at their contact points, taken along line VIII—VIII of FIG. 6.

The overlay of two fiber layers or fakes produces two rows of fiber contact points 32 as shown in FIG. 6. The perspective, cross-sectional view of the fakes, in FIG. 7, shows the fiber spiral layer pairs, in juxtaposition. The perspective, cross-sectional view of the fakes, in FIG. 8, shows the fiber spiral layer pairs, at their contact points The contact points produced are similar to the crossover sites in a precision wound coil. However, these regions 32 should not be confused with the fiber crossover regions in the conventional precision wind since little or no fiber deformation due to geometry or stress exist at the contact points. The positions of the contact points are dictated by the position of the end-of the spiral transitioning fiber. A relatively smooth winding surface is maintained by shifting the fiber transition by 90 degrees for every pair of fiber spiral layers. However, the contact points can be indexed between pairs of fakes by any where between 10 degrees and 90 degrees, to produce a better balanced coil.

More than 10,000 fiber crossovers are inherent in a typical fiber optic sensor coil that is wound using the conventional precision-wound configuration. The advanced fiber coil winding design enhances the reliability of the fiber sensor coil by eliminating the fiber crossovers that are the prime sites for fiber static fatigue failure. The elimination of fiber crossovers provides for a substantial reduction in the number of high stress sites and overall pressures within the pack that can lead to static fatigue failure. Increase storage life for miniature coils is a by-product of the advanced coil design. It also substantially reduces the polarization cross-coupling.

This fiber sensor coil design approach improves volumetric efficiency and substantially reduces the cost, since no mandrel is required. A two-fold improvement in gyroscope performance has been demonstrated in the laboratory using a crossover-free coil.

The fiber optic gyroscope has reached a level of practical use in navigation, guidance and control of aircraft, missiles, automobiles, robots, etc. The remaining primary issue to be addressed is associated with developing low cost, miniature, medium-to-high performance fiber optic gyroscope technology that can operate over adverse environments such as military environments.

The innovation in the initiation of the winding process minimizes any time-varying thermal gradients which the coil could experience while operating in adverse environments. The compensation in minimizing the radial thermal gradients far exceeds the typical quadrupolar winding configuration. The innovation in alternating the spiral layer pairs across a thin hollow disk 11 minimizes the axial thermal gradients, which is not specifically addressed in the typical quadrupolar wind configuration.

The advanced fiber coil winding technique, detailed in the subject invention disclosure, serves as a model for the development of low cost, easily manufactured, ultraminiature fiber optic gyroscope technology with improved performance and reliability. The innovation of the coil design offers a revolutionary advance in fiber optic gyroscope technology. The use of the advance winding design will greatly contribute to the success of broad array of tactical weapons and commercial aircraft, automobiles, ships, robots, etc.

I claim:

1. A substantially cylindrical symmetrically wound coil for a fiber optic rotation sensor, comprising:

a) a centrally disposed flat cylindrical disc disposed in the center of the coil, having an aperture and an inner diameter at the center thereof;

b) a continuous optical fiber of substantially uniform cross section comprising two segments of substantially symmetrical configurations with respect to said disc and extending through said aperture;

c) a spirally wound first fake of a first segment of said fiber disposed on one side of said disc in a helical spiral extending from said inner diameter of said disc to its outer circumference in closely spaced spiral loops;

d) a spirally wound first fake of a second segment of said fiber disposed on the other side of said disc in a helical spiral extending from said inner diameter of said disc to its outer circumference in closely spaced spiral loops;

e) a first connecting portion of said first segment of said fiber extending from said outer circumference of said one side of said disc across the outer circumference of said disc and said first fake of said second segment of said fiber;

f) a spirally wound second fake of said first segment of said fiber juxtaposed on the surface of said first fake of said second segment of said fiber in a helical spiral extending from th e outer circumference of said disc to the inner diameter of said disc;

g) a first connecting portion of said second segment of said fiber extending from said outer circumference of said one side of said disc across the outer circumference of said disc and said first fake of said first segment of said fiber;

h) a spirally wound second fake of said second segment of said fiber juxtaposed on the surface of said first fake of said first segment of said fiber in a helical spiral extending from the outer circumference of said disc to the inner diameter of said disc;

i) a spirally wound third fake of said first segment of said fiber juxtaposed on the surface of said second fake of said first segment of said fiber in a helical spiral extending from said inner diameter of said disc to its outer circumference in closely spaced spiral loops;

j) a spirally wound third fake of said second segment of said fiber juxtaposed on the surface of said second fake of said second segment of said fiber in a helical spiral extending from said inner diameter of said disc to its outer circumference in closely spaced spiral loops; and k) the ends of each of said segments of said fiber being adapted for connection to a fiber optic rotation sensor.

2. A substantially cylindrical symmetrically wound coil for a fiber optic rotation sensor, as set forth in claim 1, wherein a multiplicity of fakes are wound symmetrically on both sides of said disc.

3. A substantially cylindrical symmetrically wound coil for a fiber optic rotation sensor, as set forth in claim 2, wherein said second and third fakes of each of said segments of said fiber are arranged in oppositely matched pairs.

4. A substantially cylindrical symmetrically wound coil for a fiber optic rotation sensor, as set forth in claim 3, wherein said matched pairs have spaced contact points spaced by 180 degrees.

5. A substantially cylindrical symmetrically wound coil for a fiber optic rotation sensor, as set forth in claim 4, wherein said contact points are indexed for succeeding pairs of fakes on each side of said disc.

6. A substantially cylindrical symmetrically wound coil for a fiber optic rotation sensor, as set forth in claim 5, wherein said contact points are indexed by at least 10 degrees from the contact points of said preceding and succeeding pairs of said fakes.

7. A substantially cylindrical symmetrically wound coil for a fiber optic rotation sensor, as set forth in claim 6, wherein said contact points are indexed by at least 20 degrees from the contact points of said preceding and succeeding pairs of said fakes.

8. A substantially cylindrical symmetrically wound coil for a fiber optic rotation sensor, as set forth in claim 6, wherein said contact points are indexed by at least 30 degrees from the contact points of said preceding and succeeding pairs of said fakes.

9. A substantially cylindrical symmetrically wound coil for a fiber optic rotation sensor, as set forth in claim 6, wherein said contact points are indexed by at least 40 degrees from the contact points of said preceding and succeeding pairs of said fakes.

10. A substantially cylindrical symmetrically wound coil for a fiber optic rotation sensor, as set forth in claim 6, wherein said contact points are indexed by at least 50 degrees from the contact points of said preceding and succeeding pairs of said fakes.

11. A substantially cylindrical symmetrically wound coil for a fiber optic rotation sensor, as set forth in claim 6, wherein said contact points are indexed by at least 60 degrees from the contact points of said preceding and succeeding pairs of said fakes.

12. A substantially cylindrical symmetrically wound coil for a fiber optic rotation sensor, as set forth in claim 6, wherein said contact points are indexed by at least 70 degrees from the contact points of said preceding and succeeding pairs of said fakes.

13. A substantially cylindrical symmetrically wound coil for a fiber optic rotation sensor, as set forth in claim 6, wherein said contact points are indexed by at least 80 degrees from the contact points of said preceding and succeeding pairs of said fakes.

14. A substantially cylindrical symmetrically wound coil for a fiber optic rotation sensor, as set forth in claim 6, wherein said contact points are indexed by at least 90 degrees from the contact points of said preceding and succeeding pairs of said fakes.

15. A substantially cylindrical symmetrically wound coil for a fiber optic rotation sensor, comprising:

a) a centrally disposed flat cylindrical disc disposed in the center of said coil, having an aperture and an inner diameter at the center thereof;

b) a continuous optical fiber of substantially uniform cross section comprising two segments of substantially symmetrical configurations with respect to said disc and extending through said aperture;

c) a spirally wound first fake of a first segment of said fiber disposed on one side of said disc in a helical spiral extending from said inner diameter of said disc to its outer circumference in closely spaced spiral loops;

d) a spirally wound first fake of a second segment of said fiber disposed on the other side of said disc in a helical spiral extending from said inner diameter of said disc to its outer circumference in closely spaced spiral loops;

e) a first connecting portion of said first segment of said fiber extending from said outer circumference of said one side of said disc across the outer circumference of said disc and said first fake of said second segment of said fiber;

f) a spirally wound second fake of said first segment of said fiber juxtaposed on the surface of said first fake of said second segment of said fiber in a helical spiral extending from the outer circumference of said disc to the inner diameter of said disc;

g) a first connecting portion of said second segment of said fiber extending from said outer circumference of said one side of said disc across the outer circumference of said disc and said first fake of said first segment of said fiber;

h) a spirally wound second fake of said second segment of said fiber juxtaposed on the surface of said first fake of said first segment of said fiber in a helical spiral extending from the outer circumference of said disc to the inner diameter of said disc;

i) a spirally wound third fake of said first segment of said fiber juxtaposed on the surface of said second fake of said first segment of said fiber in a helical spiral extending from said inner diameter of said disc to its outer circumference in closely spaced spiral loops;

j) a spirally wound third fake of said second segment of said fiber juxtaposed on the surface of said second fake of said second segment of said fiber in a helical spiral extending from said inner diameter of said disc to its outer circumference in closely spaced spiral loops;

k) a second connecting portion of said first segment of said fiber extending from said outer circumference of said one side of said disc across the outer circumference of said disc and said third fake of said second segment of said fiber;

l) a second connecting portion of said second segment of said fiber extending from said outer circumference of said one side of said disc across the outer circumference of said disc and said third fake of said second segment of said fiber; and m) the ends of each of said segments of said fiber being adapted for connection to a fiber optic rotation sensor.

16. A method of making a substantially cylindrical symmetrically wound coil for a fiber optic rotation sensor, of a continuous optical fiber of substantially uniform cross section comprising first and second segments of substantially symmetrical configurations, onto opposed surfaces of a centrally disposed flat cylindrical disc which has an aperture having an inner diameter at the center thereof, comprising the steps of:

a) spirally winding a first fake of a first segment of said fiber disposed on one side of said disc in a helical spiral extending from said inner diameter of said disc to its outer circumference in closely spaced spiral loops;

b) spirally winding a first fake of a second segment of said fiber disposed on the other side of said disc in a helical spiral extending from said inner diameter of said disc to its outer circumference in closely spaced spiral loops;

c) extending a first connecting portion of said first segment of said fiber from said outer circumference of said one side of said disc across the outer circumference of said disc and said first fake of said second segment of said fiber;

d) spirally winding a second fake of said first segment of said fiber in juxtaposition on the surface of said first fake of said second segment of said fiber in a helical spiral extending from the outer circumference of said disc to the inner diameter of said disc;

e) extending a first connecting portion of said second segment of said fiber from said outer circumference of said one side of said disc across the outer circumference of said disc and said first fake of said first segment of said fiber;

f) spirally winding a second fake of said second segment of said fiber in juxtaposition on the surface of said first fake of said first segment of said fiber in a helical spiral extending from the outer circumference of said disc to the inner diameter of said disc;

g) spirally winding a third fake of said first segment of said fiber in juxtaposition on the surface of said second fake of said first segment of said fiber in a helical spiral extending from said inner diameter of said disc to its outer circumference in closely spaced spiral loops;

h) spirally winding a third fake of said second segment of said fiber in juxtaposition on the surface of said second fake of said second segment of said fiber in a helical spiral extending from said inner diameter of said disc to its outer circumference in closely spaced spiral loops; and i) adapting the ends of each of said segments of said fiber for connection to a fiber optic rotation sensor.

17. A method of making a substantially cylindrical symmetrically wound coil for a fiber optic rotation sensor, as set forth in claim 16, comprising the steps of winding a multiplicity of fakes on both sides of said disc.

18. A method of making a substantially cylindrical symmetrically wound coil for a fiber optic rotation sensor, as set forth in claim 17, comprising the steps of arranging said second and third fakes of each of said segments of said fiber in oppositely matched pairs.

19. A method of making a substantially cylindrical symmetrically wound coil for a fiber optic rotation sensor, as set forth in claim 18, comprising the steps of winding said matched pairs with contact points spaced by 180 degrees.

20. A method of making a substantially cylindrical symmetrically wound coil for a fiber optic rotation sensor, as set forth in claim 19, comprising the steps of winding succeeding pairs of fakes on each side of said disc with contact points spaced by 90 degrees.

* * * * *